Dec. 29, 1931.  S. A. STAEGE  1,838,967
GENERATOR BRAKING SYSTEM FOR WINDER DRIVES
Filed Oct. 20, 1930
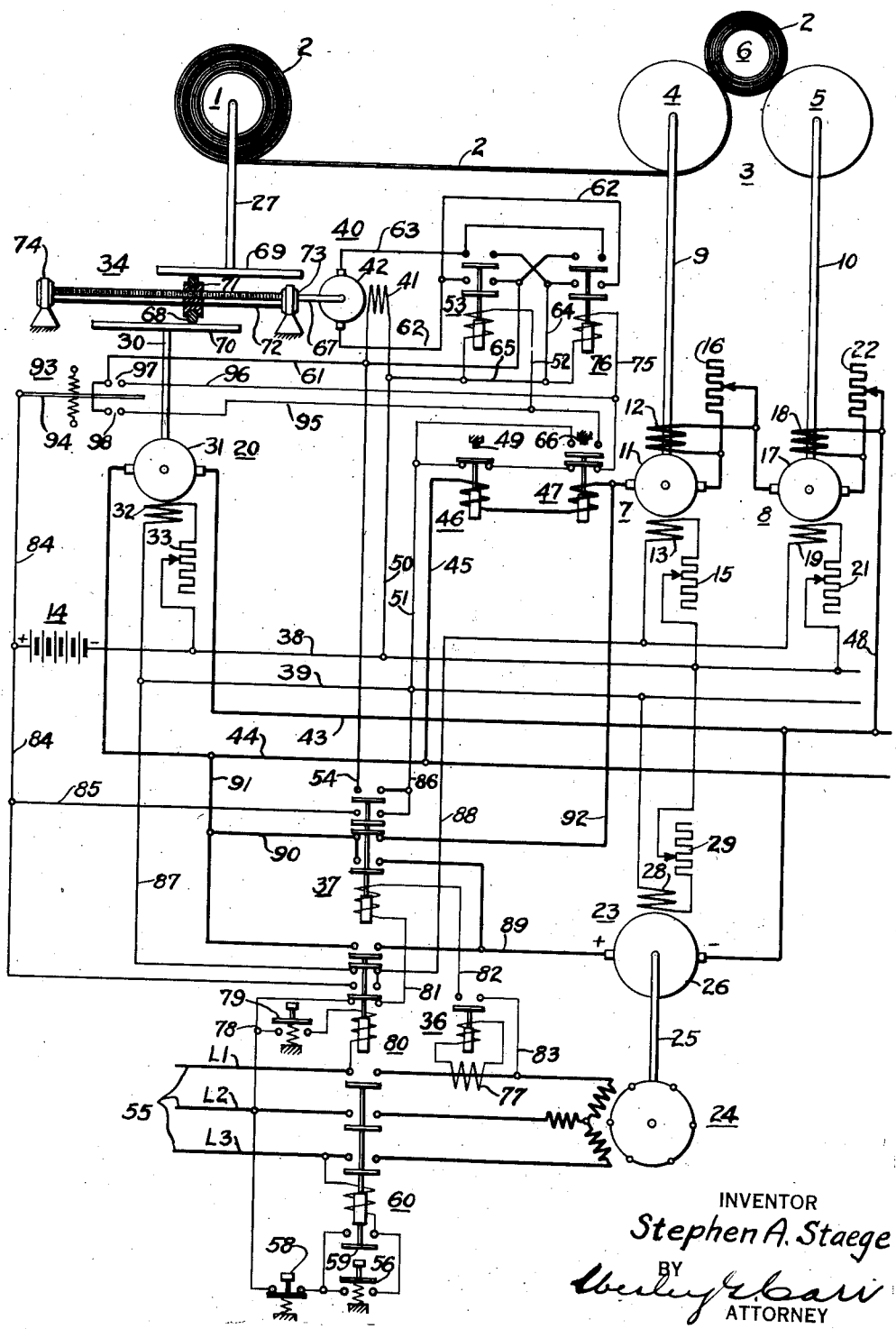
INVENTOR
Stephen A. Staege
BY
ATTORNEY Patented Dec. 29, 1931

1,838,967

UNITED STATES PATENT OFFICE

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA

GENERATOR BRAKING SYSTEM FOR WINDER DRIVES

Application filed October 20, 1930. Serial No. 489,885.

My invention relates to control systems and particularly to systems for governing the operation of winders.

An object of my invention is to provide a winder-motor drive system that shall be simple in construction and efficient in its operation.

Another object of my invention is to provide a system for maintaining substantially constant tension in material as it passes from a supply reel to a winder roller.

A further object of my invention is to provide tension-developing means that shall be operable to maintain substantially constant tension in material as it is unwound from a supply reel and wound upon a winder roller and also to develop power of substantially constant voltage for the motive means disposed to drive the winder roller.

It is also an object of the invention to produce a braking effect on the unwinder roll by a braking generator supplying electrical energy of substantially constant voltage to the electric motive means disposed to supply energy to the electric motor driving the winder roller.

Other objects of this invention will be more apparent from a study of the following specification, when considered in conjunction with the accompanying drawing, in which the single figure is a diagrammatic view of circuits and apparatus arranged in accordance with my invention.

Referring to the drawing, 1 designates a supply reel, having material 2, such as paper, wound thereon, and 3 represents the winding machine or winder.

The winder 3 comprises two rollers 4 and 5 and a core 6 disposed between the rollers in tangential relation thereto.

When material is to be unwound from the supply reel 1 and wound upon the core 6, the material 2 is drawn from the reel 1, inserted under the roller 4 and wound upon the core 6.

The roller 4 is disposed to draw or pull the material 2 from the supply reel and feed it to the core 6, upon which it is wound; and the roller 5 is disposed to control the degree of hardness or tightness with which the material is wound upon the core. When so driven, and but little material is on core 6, the roller 5 may slip slightly with respect to the material on the core, but, as the weight of the roll increases, the slip will decrease.

The respective rollers 4 and 5 of the winder 3 may be driven by direct-current motors 7 and 8 through shafts 9 and 10.

The motors 7 and 8 may be of the compound-wound type or of any other type having a drooping-characteristic speed-torque curve. As shown, the motor 7 comprises an armature 11, a series field winding 12 and a separately-excited field winding 13. The separately-excited field winding 13 may be energized by direct current from a suitable source of power, as, for example, a battery 14. The current in the shunt field winding 13 may be adjusted to any predetermined value by means of a variable resistor 15 disposed in series-circuit relation to the winding, whereby the speed of the motor may be adjusted according to the requirements of the operation of the winder 3.

In order that the drooping characteristic of the motor 7 may be adjusted, a variable resistor 16 is disposed in shunt or parallel-circuit relation to the series field winding 12.

The motor 8 is similar in construction to the motor 7 and comprises an armature 17, a series field winding 18 and a separately-excited field winding 19. The field winding 19 may be energized by direct current from the battery 14.

In order to adjust the motor 8 for operation at a predetermined speed, a variable resistor 21, disposed in series-circuit relation to the shunt field winding 19, is provided, whereby the current in the winding may be regulated or adjusted according to the speed of operation required of the motor.

Since motors 7 and 8 are similar, the drooping characteristic of the motor 8 corresponds to that of the motor 7, but, to insure that the torques developed by the respective motors may be either equal in value or bear a constant relation to one another, variable resistors 16 and 22 are disposed in shunt or parallel-circuit relation to the series field windings 12 and 18, respectively.

Power may be supplied to the motors 7 and 8 from a power or main generator 23. As shown, the generator 23 is arranged to be driven by an alternating-current motor 24 through a shaft 25. The generator 23 may be of the separately-excited type and comprises an armature winding 26 and a separately-excited field winding 28. The field winding 28 is arranged to be connected across the battery 14. In order to vary the voltage developed by the generator 23, a variable resistor 29 is connected in series-circuit relation to the field winding 28, whereby the current in the winding may be adjusted to any predetermined value.

With a view to meeting the requirements of the trade, the rolls of material coming from the winder 3 must be uniformly wound in order that the roll shall be of the same degree of tightness or hardness from the center to the outside. In order that the rolls coming from the winder may be of uniform hardness throughout, the motors 7 and 8 may be adjusted to develop different predetermined relative torques by regulating the current in the respective separately-excited field windings 13 and 19.

Where rolls of uniform hardness throughout are desired, the current in the field winding 19 of the motor 8 may be so adjusted that it will develop a higher torque than the motor 7. When the roll of material on the core 6 is small and light in weight, (the motor 8 being adjusted to develop a higher torque than the motor 7) the roller 5 will cause the material 2 to be wound tightly and smoothly upon the core 6. As the roll becomes larger in diameter and heavier in weight, a greater torque will be demanded of the motor 8 because of the increased frictional force exerted by the roller 5 of the winder. Since the torque demanded of the motor 8 is greater, the motor will run at a lower speed which will be determined by its drooping characteristic speed-torque curve. This speed may be only slightly greater than the speed of operation of the motor 7.

When the motors 7 and 8 are operated in parallel, the relative torques of the motors 7 and 8 may be made to vary during the change in size of the roll on core 6. The showing in the drawing is based on the assumption that the requirements for a given application are such that the relative torques developed by the motors 7 and 8 will be maintained at a fixed ratio, from standstill and through the acceleration period, the armatures 11 and 17 of the motors being connected in series-circuit relation. In the arrangement shown, the current in the field windings 13 and 19 may be so adjusted that the motor 8 will develop a greater torque than the motor 7. Since the armature windings of the motors are connected in series-circuit relation, the current in both armatures will be equal. In this case, the motor 8 will develop a higher torque than the motor 7 during the starting period because the current in the field winding 19 is greater than that in the field winding 13, and, when the generator 23 is developing full voltage, the motor 7 will tend to run slower than the motor 8 and develop a lower torque.

In order to maintain the tension in the material 2 constant, at a predetermined value, it is required that the voltage developed by the auxiliary or braking generator 20 shall be maintained constant at a predetermined value. Since the shaft 27 will be driven at increasingly higher speeds as the diameter of the roll on the supply reel becomes smaller, the voltage of the auxiliary or braking generator 20, if this generator be connected directly to shaft 27, will increase in proportion to the increase in speed. If the current in the field winding 32 is maintained at a predetermined value, it follows, with the direct connection suggested, that the voltage developed by the auxiliary generator 20 will also increase in value; therefore, the tension in the material 2 will increase unless some provision be made to change the field excitation of the generator 20 as a function of the tension in the material, or the speed of the generator be changed in inverse order to the change in speed of the supply reel 1.

According to heretofore known practice, the auxiliary generator 20 is connected directly to the shaft of the supply reel. In this connection, reference should be had to applicant's Patent No. 1,768,939 issued on July 1, 1930, and relating to winder motor drive control systems.

By the systems heretofore known, where the braking generator is coupled directly to the shaft 27 of the supply reel 1, or is coupled to shaft 27 through a speed reducer or a fixed ratio, the auxiliary or braking generator is required to operate over as much as a ten to one speed range for a given speed of the material 2 on account of the change in diameter of the supply reel 1. This necessitates a very large-frame generator to provide the necessary torque at the lower speed, and also imposes difficulty in obtaining a suitable machine that will stand the maximum speed.

In the present invention, a speed changer 34 is interposed between the supply reel 1 and the braking generator 20, whereby the speed of the braking generator is kept substantially constant, the operation of the speed changer being so controlled that a substantially constant tension is maintained in the material 2.

The present invention, therefore, provides means by which the braking generator may operate at substantially constant speed for a constant speed of the material by automatically and more or less continuously changing the ratio of the speed changer which forms the mechanical connection between the braking generator 20 and the supply reel 1. Furthermore, the ratio of the speed changer 34 is varied as a function of the load current of the winding motors 7 and 8, whereby a substantially constant tension is maintained in the material.

A more complete understanding of the advantages, simplicity, and novel results attained by this invention may be had from a detailed study of the various operations of the control system and the electrical devices thereby controlled.

Assuming the attendant wishes to start the rewinding operation and that the material is threaded on the winder as shown, he depresses starting switch 56, thereby establishing a circuit from one of the line conductors $L_2$ of the source of alternating-current-power supply 55, through the stop switch 58, the starting switch 56 and the actuating coil of the main-line contactor 60, to the line conductor $L_3$ of the three-phase source of alternating-current power. The instant line contactor 60 operates, a holding circuit is established for the actuating coil of the line contactor, and the starting switch may be permitted to return to its normal position.

Operation of the line contactor 60 connects the induction motor 24 to the source of alternating-current power, and the motor begins to operate to drive the direct-current generator 23. At the instant of starting of the induction motor, a heavy current is drawn from the source of power 55 and, in consequence, the no-load protective relay 36 is energized by the current transformer 77.

Upon closing of the contact members of relay 36, a circuit is established from line $L_2$, through conductor 78, the lowermost back contact members of inching and threading relay 80, conductor 81, the actuating coil of control relay 37, conductor 82, the contact members of no-load protective relay 36 and conductor 83, to the line conductor $L_1$.

Operation of the control relay 37 establishes a circuit from the positive terminal of the battery 14, through conductors 84 and 85, contact members of control relay 37 and conductor 86, to the bus 39. The bus 38 is connected directly to the negative terminal of the battery. Since the field windings of generator 23 and braking generator 20 are directly connected to busses 38 and 39, these field windings 28 and 32, respectively, will be energized when control relay 37 operates.

The field winding 41 of pilot motor 40 is energized by a circuit which may be traced from the bus 39, through conductor 86 the uppermost contact members of control relay 37, conductor 54, field windings 41 of pilot motor 40 and conductor 50, to the negatively energized bus 38. The excitation of motors 7 and 8 takes place from the positively energized bus 39, through conductor 87, the upper back contact member of threading relay 80, conductor 88, and field windings 13 and 19 and their respective adjustable rheostats 15 and 21, in parallel-circuit relation, to the negatively energized conductor 38.

Operation of relay 37 also causes establishment of the armature circuit for motors 7 and 8. The armature circuit may be traced from the positive terminal of the generator 23, through conductor 89, contact members of control relay 37 and conductors 90 and 91, to bus 44 and from bus 44, through conductor 45, the actuating coil of the current relay 46, actuating coil of current relay 47, the armature 11 of motor 7, the series field windings 12 of motor 7, the armature 17 of motor 8, the series field winding 18 of motor 8 and conductor 48, to the bus 43 which is directly connected to the negative terminal of generator 23. It is, of course, understood that the field rheostats 21 and 22 are so adjusted that motor 8 exerts a slightly greater torque than motor 7 and, in consequence, the material 2 is wound on core 6 with the desired degree of hardness. The armature 31 of braking generator 20, being connected directly to busses 43 and 44, is energized when control relay 37 has operated.

The current relay 46 is designed to operate at some predetermined current and, when it operates, its magnetic armature engages the insulating stop 49, whereby an air gap is maintained in the magnetic circuit of that relay, with the result that relay 46 is relatively sensitive to changes in the load current of motors 7 and 8.

Current relay 47 is designed to operate at some predetermined current of a greater value than that required for current relay 46. Current relay 47 is also provided with an insulated stop 66 which is so disposed that it will not prevent closing of the upper contact members of the current relay and yet maintains the armature of that relay in such position that an air gap remains in the magnetic circuit of this relay, thereby making it relatively sensitive to variations of the load current of motors 7 and 8.

In this modification, a pair of current relays 46 and 47 are shown for the purpose of controlling the direction of operation of the pilot motor 40. It is, of course, understood that a single current relay provided with the requisite number of contacts may be used instead of the two relays.

During the starting of the winder, the load current of motors 7 and 8 will be relatively high and, in consequence, both current relays 46 and 47 will be in their operated positions, the current relay 46 having its contact members in open-circuit relation, and the current relay 47 having its upper contact members in circuit-closing position. A circuit is thereby established from the negatively energized bus 38, through conductors 50 and 65, the actuating coil of directional contactor 53, conductor 52, the upper contact members of current relay 47 and conductor 51, to the bus 39. Operation of the directional contactor 53 established a circuit for the pilot motor 40, which may be traced from the bus 38, through conductors 50, 65 and 64, the upper contact members of the directional contactor 53, conductor 63, armature 42 of pilot motor 40, conductor 62, the lower contact members of the directional contactor 53, conductors 61 and 54, the uppermost contact members of control relay 37 and conductor 86, to the bus 39.

Since the field windings 41 of the pilot motor 40 were energized when control relay 37 operated, as previously explained, the pilot motor will operate to rotate its threaded shaft 67 in such direction that the disc 68 will move towards the right, intermediate the discs 69 and 70, mounted on shafts 27 and 30, respectively. It will be noted that disc 68 is rotatably mounted on a sleeve 71 that threadably engages the shaft 67. The shaft 67 is rotatably mounted in bearings 73 and 74. A guide rod 72 is rigidly secured to bearings 73 and 74 and passes through an opening in sleeve 71, thereby preventing the sleeve 71 from rotating, and, at the same time, functioning as a guide for the sleeve and the disc. Since the disc 68 moves towards the right, the speed of the braking generator 20 will be reduced and, in consequence, the tension in material 2 will be a minimum.

In a very short interval of time, the winder motors 7 and 8 attain normal operating speed, and the load current of these motors adjusts itself to some definite value, depending upon the braking action of the braking generator 20. If the braking action of the generator is not enough, and the material is being fed from the supply reels 1 with too much ease, then the load current will be rather low and, in consequence, the current relays 46 and 47 will both be in their inoperative positions, that is, the positions shown. When current relays 46 and 47 are in the positions shown, a circuit is established which may be traced from the bus 39, through conductor 51, the lower contact members of the current relay 46, the lower contact members of the current relay 47, conductor 75, the actuating coil of directional contactor 76 and conductors 65 and 50, to the other bus 38.

Energization of the actuating coil of the directional contractor 76 establishes a circuit which may be traced from the negatively energized bus 38, through conductors 50, 65 and 64, the lower contact members of the directional contactor 76, conductor 62, armature 42 of the pilot motor 40, conductor 63, the upper contact members of the directional contactor 76 and conductors 61 and 54, the upper contact members of control relay 37 and conductor 86 to the positively energized bus 39. It will be noted that the armature circuit of the pilot motor 40 is now opposite to what it was when the current relay 47 was in its operated position. In consequence, the pilot motor will now rotate in such direction that the disc 68 will be moved to the left, with the result that the speed of the braking generator 20 will tend to increase. As the speed of the braking generator increases, the tension in the material increases and the load current increases. At some predetermined current value, when the tension in the material is of the desired value, current relay 46 operates, thereby causing interruption of the armature circuit of the pilot motor.

So long as the tension in the material 2 does not change, that is, remains as desired, the position of the disc 68, longitudinally of the shaft 67, remains fixed and, in consequence, the speed of the braking generator 20 remains constant. The field rheostat 33 is so adjusted that the voltage of the braking generator 20 will be of such constant value that the energy generated by the braking action is transmitted back to the buses 43 and 44. It will thus be seen that the braking generator 20 and the main generator 23 operate in parallel to supply energy to the buses 43 and 44.

Since the diameter of the supply reel 1 decreases as more and more material is unwound, the speed of the braking generator tends to increase. However, as soon as the speed of the generator 20 exceeds a predetermined amount, the tension on the material exceeds a predetermined amount and, in consequence, the load current of the motors 7 and 8 will cause operation of the current relay 47. When current relay 47 operates, the pilot motor 40 is again energized, and the position of the disc 68 is so changed that the speed of the braking generator 20 is immediately brought back to its normal value.

From the foregoing discussion, it will be apparent that the tension on the material will be maintained substantially constant by the controlling action of the current relays 46 and 47, which control the direction of rotation of the pilot motor which, in turn, controls the speed ratio of the speed changer 34. The speed changer per se does not constitute a part of this invention and has, therefore, been shown schematically. Obviously, any type of speed changer other than that illustrated may be utilized with equal effectiveness to produce the beneficial and novel results of this control system.

By the use of the speed changer for varying the speed ratio between the supply reel 1 and the braking generator 20, such that the speed of the generator is maintained constant, a much smaller generator may be used for braking purposes than is used with devices having the braking generator connected directly to the shaft of the supply reel.

An important feature of this invention is the provision of means which prevents energization of the pilot motor except when the winder motor and braking generator are energized, thereby making it impossible to stall the pilot motor or to cause slipping of the disc 68 on discs 69 and 70 other than when they are in motion.

Another important feature of this invention is the provision of means to deenergize the pilot motor when the material breaks or when the winder motors, for any reason, are stopped. It is apparent that, if the pilot motor were not deenergized when the winder motors 7 and 8 are not operating, the disc 68 of the speed changer would run to the extreme limit in either direction at every stop of the control motors.

The foregoing problems are solved by the controlling action of control relay 37. After operation of the line contactor 60, as previously explained, the control relay 36 is energized by the current transformer 77. Energization of the actuating coil of the control relay 36 immediately causes the closing of the upper contact members of this relay, and the upper contact members remain closed during normal full-load operation. If the material breaks, thereby removing the load from the winding motors 7 and 8, the current delivered by the current transformer 77 drops to a low value, thereby deenergizing the actuating coil of the control relay 36. Deenergization of relay 36 causes interruption of the circuit for the actuating coil of the control relay 37. Deenergization of the control relay 37 causes interruption of the armature circuit of motors 7 and 8 and causes interruption of the armature and field circuits for pilot motor 40.

From the foregoing discussion, it is apparent that rupture of the material disconnects the entire control system from the respective sources of electrical power, and it is necessary for the attendant to again operate starting switch 56 to start the operation of the winder 3.

If the material is not threaded on the winder, the inching or treading relay 80 is caused to operate. To this end, push-button switch 79 is depressed to cause energization of the actuating coil of the threading relay 80. Operation of the threading relay 80 causes interruption of the circuit for the actuating coil of control relay 37, the result being that automatic and continuous operation of the winder 3 can not be caused by control relay 37, regardless of the position of no-load control relay 36.

Operation of threading relay 80 prevents energization of busses 38 and 39, but field windings 13 and 19 are, nevertheless, energized. The circuit established for field windings 13 and 19 may be traced from the positive terminal of the battery 14, through conductor 84, contact members of relay 80, conductor 88, the field windings 13 and 19 and their respective rheostats, in parallel-circuit relation, to the bus 38 directly connected to the negative terminal of the battery.

Operation of relay 80 also establishes the armature circuit for motors 7 and 8 by the closing of its uppermost contact members, the circuit to bus 44 being completed through the lower portion of the conductor 91. Since control relay 37 is not energized, a shunt circuit for current relays 46 and 47 is established through conductors 90 and 92, that is, the armature circuit for motors 7 and 8 is completed from the positive terminal of generator 23, through conductor 89, uppermost contact member of threading relay 80, conductors 91 and 90, back contact members of control relay 37 and conductor 92, to the left-hand terminal of motor 7 and, from that point, to bus 43 in the manner previously traced. From the circuit arrangement just explained, it is apparent that the pilot motor will not be caused to operate during the threading operation. Furthermore, since the field windings 28 are not energized, the generator 23 will have a very low voltage, depending on the residual magnetism in the pole pieces. The result will be that motors 7 and 8 will operate very slowly, so that the threading operation may be readily accomplished.

During each winding operation, the pilot motor 40 will travel to extreme higher-speed position for the speed changer. As a new roll is placed on shaft 27, the disc 68 should be placed somewhere near the correct position for starting operation. To accomplish this operation, the arrangement shown at 93 is provided. If the attendant desires to operate the pilot motor independently of the remainder of the control system, he moves control lever 94 to bridge one of the contact members 97 and 98, depending on which direction he desires to operate the pilot motor.

If the lever 94 is moved to make contact at 97, a circuit is established from the positive terminal of the battery 14, through conductor 84, lever 94, contact members 97, conductors 96 and 75, actuating coil of directional contactor 76 and conductors 65 and 50, to the negative terminal of the battery 14. Upon operation of directional contactor 76, an armature circuit is established for pilot motor 40, and the motor operates to place disc 68 in any desired position.

Although I have shown and described certain specific embodiments of my invention, I do not wish to be restricted to the specific structural details, arrangement of parts or circuit connections herein set forth, as various modifications thereof may be effected without departing from the spirit and scope of my invention. I desire, therefore, that only such limitations shall be imposed as are indicated by the appended claims.

I claim as my invention:

1. In a roll-winding system, in combination, a supply reel for material, a roller disposed for winding material as it is unwound from the supply reel, motive means for driving said roller, a main generator for supplying power to said motive means, a motor for driving said main generator, an auxiliary generator connected in parallel-circuit relation to said main generator and arranged to be driven by the supply reel, when material is unwound therefrom, to produce a drag upon the supply reel, and a speed-changing system for maintaining the speed of the auxiliary generator substantially constant, regardless of changes in speed of the supply reel.

2. In a roll-winding system, in combination, a supply reel for material, a roller disposed for winding material as it is unwound from the supply reel, motive means for driving said roller, a main generator for supplying power to said motive means, a motor for driving said main generator, an auxiliary generator connected in parallel-circuit relation to said main generator, a speed changer disposed intermediate the supply reel and the auxiliary generator, and a pilot motor responsive to the tension in the material for controlling the speed changer, whereby the auxiliary generator is caused to operate at a substantially constant speed and is caused to produce a substantially constant drag on the supply reel, regardless of the changes in speed of the supply reel.

3. In a roll-winding system, in combination, a supply reel for material, a plurality of rollers disposed to carry a core in tangential relation therewith, upon which core material may be wound from the supply reel, a motor for driving each of said rollers, a main generator for supplying power to said motors, a motor for driving said generator, an auxiliary generator disposed for operation by said supply reel and connected in parallel-circuit relation to said main generator, a speed changer for mechanically connecting the supply reel to the auxiliary generator, and means responsive to the tension in the material to control the speed ratio of the speed changer in such manner that the auxiliary generator is driven at substantially constant speed, regardless of changes in speed of the supply reel.

4. In a roll-winding system, in combination, a supply reel for material, a roller disposed for winding material as it is unwound from the supply reel, motive means for driving said roller, a main generator for supplying power to said motive means, a motor for driving said main generator, an auxiliary generator connected in parallel-circuit relation to said main generator, a speed changer mechanically connecting the auxiliary generator to the supply reel, whereby the auxiliary generator acts as a drag or braking generator on the supply reel, control means responsive to the tension in the material controlling the speed changer to maintain the speed of the auxiliary generator substantially constant.

5. In a roll-winding system, in combination, a supply reel for material, a plurality of rollers disposed to carry a core therebetween in tangential relation thereto, upon which core material may be wound from the supply reel, a motor for driving each of said rollers said motors being connected in series-circuit relation, a main generator for supplying power to said motors, an auxiliary generator connected in parallel-circuit relation to said main generator, thereby also supplying energy to said motors, a speed changer mechanically connecting the auxiliary generator to the supply reel, a pilot motor responsive to the load current of the motor for controlling the speed ratio of the speed changer, and control means for causing operation of the pilot motor only at a time when the motors for driving the rollers operate.

6. In a roll-winding system, in combination, a supply reel for material, a plurality of rollers disposed to carry a core in tangential relation thereto, upon which core material may be wound from the supply reel, a motor for driving each of said rollers said motors being connected in series-circuit relation, a main generator for driving said motors, a main motor for driving the main generator, an auxiliary generator connected in parallel-circuit relation and arranged to be driven by the supply reel, a speed changer mechanically connecting the auxiliary generator to the supply reel, a pilot motor for changing the speed ratio of the speed changer, a pair of current relays connected in series with said motor and controlling the direction of rotation of the pilot motor.

7. In a roll-winding system, in combination, a supply reel for material, means for unwinding the material from the supply reel, a braking generator disposed to be driven by the supply reel, a speed changer for changing the speed ratio between the supply reel and the braking generator, a pilot motor responsive to the tension in the material for controlling the speed changer in such manner that the tension on the material and, in consequence, the voltage of the generator is maintained substantially constant.

In testimony whereof, I have hereunto subscribed my name this 15th day of October, 1930.

STEPHEN A. STAEGE.